United States Patent [19]

Sydansk

[11] Patent Number: 4,505,751

[45] Date of Patent: Mar. 19, 1985

[54] PROCESS FOR UTILIZING A SILICATE/SILICA CEMENT IN OIL FIELD APPLICATIONS

[75] Inventor: Robert D. Sydansk, Littleton, Colo.

[73] Assignee: Marathon Oil Company, Findlay, Ohio

[21] Appl. No.: 541,194

[22] Filed: Oct. 12, 1983

[51] Int. Cl.$^3$ ............................................. C04B 19/04
[52] U.S. Cl. ...................................... 106/84; 166/292
[58] Field of Search ........................... 106/84; 166/292

[56] References Cited

U.S. PATENT DOCUMENTS

| | | | |
|---|---|---|---|
| 1,450,467 | 4/1923 | Weyland | 106/85 |
| 1,547,189 | 7/1925 | Wilson | 106/76 |
| 1,587,057 | 6/1926 | Winship | 106/85 |
| 2,237,313 | 4/1941 | Prutton | 166/21 |
| 3,202,214 | 8/1965 | McLaughlin, Jr. | 166/30 |
| 3,434,855 | 3/1969 | Webb | 106/84 |
| 3,442,665 | 5/1969 | Muller et al. | 106/84 |
| 3,515,216 | 6/1970 | Gies | 166/288 |
| 3,965,986 | 6/1976 | Christopher | 166/292 |
| 3,990,903 | 11/1976 | Mallow | 106/84 |
| 4,162,238 | 7/1979 | Bergna | 106/84 |
| 4,277,355 | 7/1981 | Farcnik | 106/84 |
| 4,311,530 | 1/1982 | Pimenov et al. | 106/84 |
| 4,326,890 | 4/1982 | Benichou | 106/84 |

*Primary Examiner*—James Poer
*Attorney, Agent, or Firm*—Jack L. Hummel; Rodney F. Brown

[57] ABSTRACT

A process for formulating and applying a silicate/silica cement composition to the treatment of a wellbore comprising the steps of mixing an appropriate silica compound with an aqueous water-soluble silicate solution and injecting the mixture into the wellbore in such a manner as to penetrate void spaces in or adjoining the wellbore. The mixture is cured in place, hardening into a solid impermeable cement which plugs the penetrated void spaces.

14 Claims, No Drawings

4,505,751

PROCESS FOR UTILIZING A SILICATE/SILICA CEMENT IN OIL FIELD APPLICATIONS

TECHNICAL FIELD

The invention relates to a silicate/silica cement composition and process for formulating the cement and more specifically to a process for formulating and injecting the cement into an injection or production well to cement pipe in place or plug void spaces.

BACKGROUND ART

Cements have numerous subterranean applications in oil fields. Primary cementing processes inject cement into the wellbore interstices between the formation face and pipe, such as casing or tubing, as the pipe is being set. The cement bonds the pipe in place to the rock face and also plugs the interstitial voids to prevent fluid communication between different strata immediately behind the wellbore. Squeeze cementing is a secondary process wherein cement is injected into the wellbore interstices to correct prior primary cement jobs, which have failed.

In other applications, cement is injected into a well to shut off very high permeability anomalies existing near the wellbore. These anomalies, such as fractures, fracture networks, thief zones, vugs and are undesirable because they significantly diminish the performance of injection wells by channeling injected flids away from hydrocarbon-rich zones. They also diminish the performance of production wells by promoting premature and extensive water production. Finally, injected cement is used as a permanent plug of abandoned wells.

Portland cement is the most commonly used cement in these applications. U.S. Pat. No. 1,547,189 to Wilson teaches mixing sodium silicate alone with Portland cement in an aqueous medium. The mixture is pumped into an oil well to shut off water entering the wellbore.

A number of other silica containing preparations exist for use in conjunction with well treatment processes. U.S. Pat. No. 2,237,313 to Prutton treats wellbore faces with a liquid silicate mixture to stabilize the rock. The liquid is pumped into the wellbore where it penetrates the rock and hardens over time into a solid gel. U.S. Pat. No. 3,202,214 to McLaughlin teaches the use of sodium silicate gels to shut off permeable zones in a subterranean formation penetrated by a wellbore. U.S. Pat. No. 3,515,216 to Gies describes a process for consolidating sand formations penetrated by a wellbore. The formation is heated to a high temperature by injected steam and then a saturated silica solution is introduced into the formation at a constant flow to effect consolidation. In U.S. Pat. No. 3,965,986 to Christopher, high permeability zones of a subterranean formation are plugged by injecting a liquid colloidal silica suspension and a surfactant into the zones which contact in situ to form a solid gel plug. U.S. Pat. No. 3,990,903 to Mallow teaches a hydrothermal method of cementing a pipe string in a borehole using a cement composition containing a polyvalent metal ion, a hydratable silicate and water. The cement sets upon exposure to high temperature.

The use of silica containing cement is also known in applications unrelated to oil production. U.S. Pat. No. 1,450,467 to Weyland teaches the manufacture of a cement used as a filling for teeth by adding an inorganic base to an aqueous solution of a hydrolyzed organic silicon compound. U.S. Pat. No. 1,587,057 to Winship mixes fused silica with a sodium silicate solution to form a stiff paste. The paste may be molded into any desired form and hardened.

In many cases, cements used in oil field applications perform unsatisfactorily. During curing, Portland cement exhibits excessive shrinkage and filtrate loss and has a protracted set up time. The cured product is brittle and has poor adhesion properties. Silicate cements previously used in oil field applications are inadequate over a broad range of formation conditions. If the cement is incompatible with the formation conditions, it may fail to harden.

An improved cement and cementing process are needed for primary and secondary cementing of wellbores, plugging wellbores or shutting off near-wellbore, very high permeability anomalies. A process is needed whereby a pumpable cementing composition can be injected into a well to perform these functions by setting up over a broad range of subterranean conditions.

DISCLOSURE OF THE INVENTION

The present invention provides an improved cement and cementing process having a number of oil field applications. The cement is formulated by admixing an appropriate solid silica compound in an aqueous solution containing a water-soluble silicate. The resulting mixture is initially flowing and pumpable, but reacts over time to form a solid cement. The period beginning when the reactive components are first contacted in an aqueous medium and ending when the cement hardens to a solid is defined as the set up or curing time of the cement. The set up cement is inert in a subterranean environment, impermeable to fluids and quite rigid, although it retains some elasticity.

The pumpable mixture is injected into a well as a primary or secondary cementing agent. In primary cementing applications, the mixture is injected into the interstitial void spaces between piping, such as casing or tubing, and the formation face as the piping is set in place. Upon setting up, the cement bonds the pipe to the rock and plugs the interstitial voids. Secondary or squeeze cementing is a remedial process where primary cementing has failed. The mixture is injected into the well in a manner similar to primary cementing.

Primary and secondary cementing of production wells prevents fluids from flowing vertically behind the wellbore in an unfavorable manner. Cementing of injection wells insures that injected fluids enter the desired zones. The cement formulation may also be injected into wells for other applications including shutting off near-wellbore, very high-permeability anomalies or permanently plugging the well.

The particular function of the cement depends on the location of the void space into which the mixture is injected and the quantity of the mixture injected. Once the mixture is in place in the desired void space, it reacts to set up as a solid cement. The set up time and strength of the cement are functions of the type and concentration of the silica and silicate components and the curing temperature, which is the temperature of the environment wherein the cement sets up. Inert solids can be added to the reaction to alter the set up time and structural strength of the resulting cement.

The process of formulating and applying the silicate/silica cement offers distinct advantages over known methods of wellbore cementing because the dependent variables of cement set up time and strength may be readily controlled by varying the independent process parameters to adapt the process to any of the subterranean applications noted above. The cement composition itself is an economical alternative to known compositions because it consists of relatively inexpensive inorganic materials and is self diverting from low permeability zones, which minimizes the amount of cement required to treat a given subterranean volume. The cement displays little shrinkage, brittleness or filtrate loss during curing and has good adhesion properties to formation rock and metal pipe.

BEST MODE FOR CARRYING OUT THE INVENTION

The process comprises formulating a cementing composition by combining an appropriate silica compound with an aqueous solution containing a water-soluble silicate. The appropriate silica compound and silicate used in the cement-forming reaction are both $SiO_2$ containing compounds which may be characterized by the molar ratio $SiO_2/M_2O$ where M is a monovalent cation such as sodium or potassium. An appropriate silica compound has an $SiO_2/M_2O$ ratio approaching infinity; the appropriate silica compound contains essentially only $SiO_2$ and possibly a minor amount of water. It contains almost no monovalent cations. Particular species of silica compounds are defined by the degree of three dimensional crystallinity in the molecular structure, which is usually inversely related to the amount of water contained in the silica compound. Quartz has an entirely crystalline structure and contains virtually no water while diatomaceous earth and silica gel have decreasing degrees of crystallinity and an increasing water content.

Preferred species of silica compounds are those which are at least somewhat more amorphous than quartz and produce some water upon extreme heating. The most preferred species is silica gel because of its relatively low degree of crystallinity, water content and large surface area. Silica gel readily reacts with water-soluble silicate at room temperature. Silica gel is alternatively termed precipitated hydrated silica or silicic acid and is characterized by the equivalent formulas $Si(OH)_4$ or $SiO_2.2H_2O$. Alternate species of silica compounds may be used which are more crystalline than silica gel such as diatomaceous earth or opal. However, to achieve the same set up time using more crystalline compounds, the curing temperature must be increased, corresponding proportionally to the degree of crystallinity of the species. Thus, a high temperature facilitates the reaction between the water-soluble silicate material and more inert crystalline species such as diatomaceous earth.

The silica compound used in this process is a solid, which is quite insoluble in water. It is produced in particle form, but may be ground up into even finer particles to facilitate contacting the water-soluble silicate in the reaction mixture. When reacting with silicate, the silica compound acts as a weak acid.

The ratio of $SiO_2/M_2O$ in the water-soluble silicate is in the range of from about 0.5 to about 5. Water-soluble silicate only exists in the presence of a free hydroxide ions; the aqueous solution containing the water-soluble silicate is alkaline. The preferred water-soluble silicate is sodium silicate.

Although an appropriate silica compound and water-soluble silicate are the only reactive species necessary to form a silicate/silica cement, one or more inert solids may be added to the reaction mixture to improve the reaction performance. Inert solids disperse the silica compound during initial mixing of the reactive components, increase the viscosity of the reaction solution and suspend the silica compound in the silicate solution during long set up times. The net effect is to assure favorable contacting of the reactants. Inert solids can also add structural strength to the solid product and reduce the free water content of the product, decreasing the potential for filtrate loss. The inert solid can be virtually any water insoluble particulate material. Even highly crystalline silica compounds such as ground quartz may be used as long as the curing temperature is maintained below the temperature at which quartz readily reacts with water-soluble silicate.

All the components of the cement are mixed at the surface in a single aqueous mixture. The solid, water-insoluble silica compound is mixed with an aqueous water-soluble silicate solution. An inert solid may also be added to the mixture. The mixture is then injected into the desired treatment location via the well. The cement composition remains pumpable for a time period sufficient to pump it down the well to the desired treatment location where it hardens. This period ranges from virtually instantaneous to several days depending on the specific cement formulation and reaction conditions. As noted above, the cement is used in such wellbore treatment processes as primary and secondary cementing, water shut-off and well plugging.

The operable concentration ranges of the components in the reaction mixture are expressed in terms of the percentage by weight of each component relative to the entire weight of the mixture, which includes a silica compound, an aqueous water-soluble silicate solution and optionally one or more inert solids.

The concentration of the silica compound in the reaction mixture is from about 0.1 to about 60% by weight and preferably from about 1 to about 20% by weight. The concentration of the water-soluble silicate solution in the reaction mixture is about 20 to about 99% by weight and preferably from about 35 to about 97% by weight. The concentration by weight of silicate solids in the solution relative only to the total weight of the water-soluble silicate solution is about 5 to about 60% by weight and preferably about 25 to about 55% with the remainder being water. The concentration of inert solids in the reaction mixture is 0 to about 80% by weight and preferably about 10 to about 50% by weight.

The properties of the resulting silicate/silica cement vary widely depending on the values selected from the independent process parameters. The independent parameters affecting the dependent parameters of cement set up time and cement strength for a given curing temperature, include the physical and chemical properties of the reactive and unreactive materials selected and their concentrations in the reaction mixture. The particular properties of the silica compound, which include the degree of crystallinity, water content, physical dimensions and purity, strongly influence the dependent parameters. For example, increasing the concentration of silica compound or utilizing a less crystalline silica compound reduces the set up time of the cement because the silica compound is the limiting reactant in the cement formation process. Likewise increasing the mesh number and surface area of the silica compound reduces the set up time. The silica compound may be pretreated by firing it at a high temperature to increase the set up time of the cement. Also increasing the concentration of silica compound in the reaction mixture generally increases the strength of the cement.

With respect to the water-soluble silicate, decreasing its $SiO_2/Na_2O$ ratio increases the set up time. Decreasing the concentration of water-soluble silicate increases the set up time of the cement but may also reduce cement strength. Increasing the concentration of inert solid increases set up time and may also increase cement strength. Unreactive water-soluble materials such as incorporated salts can also be added to the reaction mixture to reduce the set up time of the cement. Encapsulating materials can be used to coat over the silica particles thereby increasing set up time.

The curing temperature is a factor affecting the set up time and strength of the cement. Increasing the temperature increases the reaction rate and can reduce the structural strength of a given silicate/silica cement. However, a strong silicate/silica cement can be produced at an elevated temperature by using a more crystalline species of silica than silica gel at higher concentrations, such as diatomaceous earth and opal. Clay may also be substituted for silica gel. As shown in the examples, some silicate/silica formulations do not harden at room temperature but readily harden at higher temperatures.

The following examples illustrate embodiments of the instant process but are not to be construed as limiting the scope of the invention. All concentrations are given in weight % unless stated otherwise.

EXAMPLE 1

A silicate/silica cement is formulated such that 60.0% is a sodium silicate solution comprised of 38% silicate solids and 62% water, the silicate solids having an $SiO_2/Na_2O$ molar ratio of 3.32, 35.6% is inert crystalline silica, which is a 325 mesh ground quartz, and 4.4% is 100–200 mesh silica gel that has been pretreated by firing it at 775° C. for 4 hours. The cement remains pumpable for 8 hours after mixing. The mixture is injected into a Hassler holder packed with 3 mm glass beads to a depth of 7.62 cm. The mixture sets to a rigid solid within 16 hours at room temperature. The cement reduces the bead pack permeability from about 3,000,000 millidarcies (md) to <0.014 md for flows applied in both directions and a pressure drop across the bead pack of 1000 psi over a period in excess of 7 hours.

EXAMPLE 2

A silicate/silica cement is formulated in the same relative proportions as Example 1. However, the silica gel has been pretreated by firing it at 850° C. The cement does not set up after 2 days at room temperature. The formulation is then placed in an oven at 80° C. and hardens to a rigid solid in less than 2 hours.

EXAMPLE 3

A silicate/silica cement is formulated such that 59.0% is the sodium silicate solution of Example 1, 36.6% is the crystalline silica of Example 1 and 4.4% is 100–200 mesh silica gel. 2 cm smooth, rounded, river-bottom rock is coated with a drilling mud-like fluid consisting of 100 cm³ of a 2000 ppm solution of partially hydrolyzed polyacrylamide (PHPA) in distilled water and 10 g of sodium bentonite. The PHPA has an average molecular weight of about 5 million and about 30% of the amide groups are hydrolyzed. The drilling mud-like fluid is viscous and slimy leaving a thick coating on the rock. The excess coating is removed from the rock and the rock is immersed in the freshly formulated cement contained in a bottle. The cement hardens overnight into a homogeneous impermeable rigid solid mass having the same apparent properties as a second cement formulation without the coated rock immersed in it. The bottle tests demonstrate the compatibility of silicate/silica cement with a drilling mud-like fluid.

EXAMPLE 4

The rock of Example 3 is coated with a crude oil and immersed in the fresh formulated cement of Example 3. Once again the cement hardens overnight into a solid mass demonstrating the compatibility of silicate/silica cement with rock coated with crude oil.

EXAMPLE 5

Three separate glass tubes are packed with a 2.0 cm river-bottom rocks, 2 cm chunks of Portland cement, and 5 mm glass beads respectively. The glass bead pack had a permeability of around 9000 darcies. The cement of Example 3 is injected into all 3 packs. After hardening, the cement reduces the permeability of all 3 packs to <0.04 md.

EXAMPLE 6

A silicate/silica cement is formulated such that 60.0% is the sodium silicate solution of Example 1, 34.8% is the crystalline silica of Example 1 and 5.2% is 100–200 mesh silica gel that has been pretreated by firing it at 700° C. for 4 hours. 3 mm glass beads are packed into a 7.6 cm × 2.3 cm ID stainless steel tube. The bead pack is flooded with a 1% NaCl solution, then a crude oil from the Tensleep Formation, Bighorn Basin, Wyoming (a viscous and wetting crude oil), and finally with the 1% NaCl solution again. Next about 1 pore volume of the formulated silicate/silica cement is carefully injected and allowed to cure for 48 hours. Over the next 13 days, the cemented pack is subjected to a differential pressure of 500 psi during 5 separate intervals of either 4 or 8 hours. No appreciable flow is noted through the pack (<0.2 cm³/4 hrs). In addition, the cement is noted to effectively displace the residual crude oil during the cement injection.

EXAMPLE 7

A silicate/silica cement is formulated by mixing 2.8 g of diatomaceous earth with 10 cm³ of a sodium silicate solution comprised of 32% silicate solids and 68% water, the silicate solids having an $SiO_2/Na_2O$ molar ratio of 3.86. The mixture is maintained at a temperature of 80° C. After 14 days at this temperature, the mixture forms a rigid, solid cement.

While the foregoing preferred embodiment of the invention has been described and shown, it is understood that the alternatives and modifications, such as those suggested and others may be made thereto, and fall within the scope of the invention.

What is claimed is:

1. A process for plugging void spaces in or adjoining a well bore with a silicate/silica cement comprising the steps of:
    (a) admixing a substantially water-insoluble silica compound, which is at least somewhat more amorphous than quartz, in an aqueous solution containing a water-soluble silicate to produce a mixture comprised of about 0.1 to about 60 percent by weight of said silica compound, after 20 to about 99 percent by weight of said aqueous solution containing said water-soluble silicate and about 0 to about 80 percent by weight of an inert solid;

(b) injecting said mixture into said well bore so that said mixture penetrates said void spaces;

(c) curing said mixture at the formation temperature to form said silicate/silica cement in said void spaces wherein the set up time and strength of said cement are a function of the formation temperature, the concentration of said silica compound and water-soluble silicate in said reaction mixture, and the properties of said silica compound and water-soluble silicate; and (d) plugging said void spaces with said silicate/silica cement.

2. The process of claim 1 wherein said silica compound has an $SiO_2/M_2O$ molar ratio approaching infinity where M is a monovalent metal cation.

3. The process of claim 1 wherein said silica compound contains some water.

4. The process of claim 1 wherein the set up time of said cement decreases as the degree of amorphousness of said silica compound is increased for a given formation temperature.

5. The process of claim 1 wherein the set up time of said cement decreases as the concentration of said silica compound in said mixture is increased for a given formation temperature.

6. The process of claim 1 wherein the concentration of said silica compound in said mixture is increased to achieve a given set up time as the degree of amorphousness of said silica compound is decreased.

7. The process of claim 2 wherein said silica compound is selected from the group consisting of diatomaceous earth, opal, clay and silica gel.

8. The process of claim 7 wherein said silica compound is silica gel.

9. The process of claim 1 wherein said water-soluble silicate has an $SiO_2/M_2O$ molar ratio of from about 0.5 to about 5 where M is a monovalent metal cation.

10. The process of claim 9 wherein said water-soluble silicate is sodium silicate.

11. The process of claim 1 wherein an inert solid is admixed to said aqueous solution.

12. The process of claim 1 wherein said aqueous solution is comprised of about 5 to about 60% by weight of said silicate and about 40 to about 95% by weight of free water.

13. The process of claim 1 wherein the mixture is comprised of about 1 to about 20% by weight of said silica compound, about 35 to about 97% by weight of said aqueous solution containing said water-soluble silicate and about 10 to about 50% by weight of said inert solid.

14. The process of claim 13 wherein said aqueous solution is comprised of about 25 to about 55% by weight of said silicate and about 45% to about 75% by weight of free water.

* * * * *

UNITED STATES PATENT AND TRADEMARK OFFICE
CERTIFICATE OF CORRECTION

PATENT NO. : 4,505,751

DATED : March 19, 1985

INVENTOR(S) : Robert D. Sydansk

It is certified that error appears in the above-identified patent and that said Letters Patent are hereby corrected as shown below:

Col. 1, line 27:   Delete "vugs and" and insert --and vugs,--.
Col. 1, line 29:   Delete "flids" and insert --fluids--.
Col. 3, line 62:   Delete "a" before the word "free".
Col. 4, line 52:   Delete "from" and insert --for--.
Col. 6, line 68:   Delete "after" and insert --about--.

Signed and Sealed this

Fifth Day of May, 1987

Attest:

DONALD J. QUIGG

Attesting Officer

Commissioner of Patents and Trademarks